3-9…

United States Patent Office 3,014,779

Patented Dec. 26, 1961

3,014,779

SELENIDES AND METHODS OF MAKING SAME

John B. Conn, Westfield, James V. Magee, South Orange, and Edward J. Sheehan, Rahway, N.J., assignors to Merck & Co., Inc., Rahway, N.J., a corporation of New Jersey No Drawing. Filed Oct. 5, 1956, Ser. No. 614,083
15 Claims. (Cl. 23—50)

This invention relates generally to metallic selenides and to a new method for preparing such compositions. More particularly, it is concerned with metallic selenides in which the metal is in group IIB of the periodic table of elements and with a process of making these selenides by hydrazine reduction of the corresponding metal selenites. It relates also to hydrozinates which are key intermediates in the process.

Selenides of the metals of group IIB of the periodic table of elements (hereinafter referred to as group IIB metals) are semi-conductors of importance in the electronics industry. For instance, the selenides of zinc and cadmium, when suitably activated, have photoluminiscent and photoconducting properties. After activation with a small amount of copper, zinc selenide luminesces red under cathode-ray bombardment, and cadmium selenide becomes a broad spectrum photoconductor having particular sensitivity at the red end of the spectrum. Such compounds are useful in the so-called "magic eye" devices and in some color television systems. Selenides of copper, mercury and lead are likewise semi-conductors and of value in the electronic field.

As electronic chemicals, it is of utmost importance that these metal selenides be ultra-pure, that is substantially free of metals of groups in the periodic table of elements other than those used as activators. Freedom from group VIII metals, such as iron, cobalt and nickel, is particularly critical since even a few parts per million of such contaminants seriously interfere with the semi-conducting properties. In their ultra-pure state, these metal selenides are known as intrinsic selenides. The intrinsic selenides themselves should have little or no semi-conducting properties.

The electronic properties appear when the balance of electrical charges in the ultra-pure selenides is disturbed by the presence of imperfections. These may be vacancies caused by a slight compositional imbalance or the incorporation of certain types of foreign atoms (activators) into the selenide. The activators are normally metals of the periodic table groups which bracket the groups of the main constituent elements. For instance, copper and silver, of group IB, are common activators for zinc and cadmium selenides, zinc and cadmium falling in group IIB. The amount of activator must be rigorously controlled and is ordinarily accomplished today by first obtaining the selenide in the highly pure state (the intrinsic form) and then incorporating a measured amount of the desired activator. This step of introducing the desired "impurity" is referred to as activating or "doping."

It will be appreciated, therefore, that any feasible synthesis of these metal selenides must be capable of giving ultra-pure selenides for the electronic industry as well as meeting other requirements such as high yield and freedom from health and safety hazards. The selenides are highly toxic materials and care must be taken to avoid exposure to them.

It is one object of our invention to provide such a synthesis in which the selenides are made by reduction of the corresponding selenites. It is a more particular object to provide a process in which the reduction is carried out with hydrazine.

Provision of the heretofore unknown hydrozinates of certain group IIB metal selenides is another object of our invention, and still another object is the synthesis of a new form of group IIB metal selenides from such hydrazinates. Yet another object is a means of uniformly activating these selenides for use in the electronic industry during their synthesis, thus obviating the need to activate them by an additional, distinct operation. Other objects will become apparent from the detailed explanation of the invention below.

Our overall process for making metal solenides may be illustrated by the equation:

$$(1)\quad 2MSeO_3+5N_2H_4\rightarrow 2MSe+2N_2H_4+6H_2O+3N_2$$

wherein M is a metal of group IIB of the periodic table of elements, copper or lead.

In the periodic classification of the elements, the elements normally placed in group IIB are zinc (Zn), cadmium (Cd) and mercury (Hg). (Cf. The Merck Index, sixth edition, inside front cover.) However, in our process lead (Pb) selenite and copper (Cu) selenite react as do Zn, Cd and Hg, and therefore in describing and claiming our invention we will discuss copper and lead with the group IIB metals although they are classified as within groups IB and IVA of the periodic table of elements. The metals discussed herein are therefore:

| | Atomic weight |
|---|---|
| Copper (Cu) | 63.54 |
| Zinc (Zn) | 65.38 |
| Cadmium (Cd) | 112.41 |
| Mercury (Hg) | 200.61 |
| Lead (Pb) | 207.21 |

The first step of our process comprises reaction of a metal selenite with hydrazine. We employ a significant stochiometric excess of hydrazine in order to prevent separation of metallic selenium during the reaction. Preferably at least four moles of hydrazine hydrate per mole of selenite are used, and optimum results are obtained with about seven moles of hydrazine hydrate per mole of selenite. Of course, larger molar excesses may be used, and we have employed as much as a 14 molar excess, but no particular advantages are obtained in most instances. Commercially available 85% hydrazine hydrate is a suitable starting material. The hydrazine may be diluted with water to avoid too vigorous a reaction. For preparation of the ultra-pure selenides, highly pure reactants are utilized. In those cases where the commercially available reactants contain excessive amounts of undesirable contaminants, they may be purified by suitable techniques prior to reaction. For instance, hydrazine hydrate may be redistilled if desired, although this usually is unnecessary.

We carry out this hydrazine reduction at elevated temperature ranging from about 50–55° C. up to the boiling point of the reaction mixture, about 120° C. Good results are obtained by operating between about 75° C. and 100° C. The metal selenite is added to the hydrazine at the desired reaction temperature. Since nitrogen is evolved during reaction, the selenite is added gradually to avoid a violent evolution of gas. Considerable heat is generated and after reaction between the selenite and hydrazine has begun, external heating is usually not necessary to maintain the reaction temperature.

The reaction between the metal selenite and hydrazine may be effected by heat alone. However, in some cases the reaction is much smoother when catalyzed by a small quantity of an anion of an organic carboxylic acid, such as formate, acetate, propionate, butyrate or benzoate ion. A preferred embodiment of our invention is the use of such a catalyst. It may be added in solution as a salt, the metal corresponding to the metal of the selenite or as the free acid. Thus, examples of suitable catalysts are acetic acid, zinc acetate, zinc formate, formic acid, cadmium acetate, cadmium propionate, mercuric acetate, lead acetate, lead benzoate, benzoic acid, copper acetate and the like. The reaction is continued until evolution of nitrogen is complete. Ordinarily from about 15 minutes to about five hours are adequate to complete the reaction.

The course of the metal selenite-hydrazine reaction depends on the particular metal selenite being reduced, although in every case the complete reduction of selenite to selenide follows Equation 1 above. When selenites of a group IIB metal having an atomic weight of greater than 64 and less than 113, i.e. Zn and Cd, are treated with excess hydrazine, there is first obtained an intermediate metal selenide hydrazinate of the formula:

$$MSe.N_2H_4$$

wherein M is zinc or cadmium. These new hydrazinates are key intermediates in the reduction of zinc and cadmium selenite to their selenides, and are formed according to the reaction:

$$(2)\quad 2HSeO_3+5N_2H_4 \rightarrow 2MSe.N_2H_4+6H_2O+3N_2$$

They are subsequently converted by heat or acid to the selenides following Equation 3:

$$(3)\quad 2MSe.N_2H_4 \xrightarrow[\text{heat}]{\text{Acid and/or}} 2MSe+2N_2H_4.\text{acid (or } 2N_2H_4)$$

Zinc selenide hydrazinate is a normally stable solid compound as formed in the reaction mixture. It is isolated by normal techniques, such as by filtration or centrifugation, and may be dried if desired or else used directly in the wet state for the conversion to zinc selenide. When dry, it is a white or off-white crystalline material having a well-defined X-ray diffraction pattern characterized by the following lines:

$ZnSe.N_2H_4$—X-ray diffraction
Radiation—Cuk$\alpha_1\alpha_2$: 35 kvp., 15 ma., nickel filter
Divergence slits—½° to 18°; 1° to 60°.
Scanning rate: ¼°/min.

| Line | Spacing $d$ (A.) | Relative Intensity $I/I_2$ (percent) |
|---|---|---|
| 1 | $8.34_5$ | 31 |
| 2 | 7.19 | (100) |
| 3 | 4.80 | 7 |
| 4 | $4.61_5$ | 8 |
| 5 | $3.89_5$ | <2 |
| 6 | 3.65 | 7 |
| 7 | 3.57 | 9 |
| 8 | 3.32 | 16 |
| 9 | $3.22_5$ | 53 |
| 10 | 3.17 | 16 |
| 11 | 3.12 | 18 |
| 12 | 3.01 | 2 |
| 13 | 2.96 | 6 |
| 14 | $2.93_5$ | 12 |
| 15 | 2.89 | 6 |
| 16 | $2.84_0$ | 9 |
| 17 | $2.76_3$ | <2 |
| 18 | 2.598 | 3 |
| 19 | 2.549 | <2 |
| 20 | 2.468 | 3 |
| 21 | 2.405 | 2 |
| 22 | 2.390 | 6 |
| 23 | 2.295 | 5 |
| 24 | 2.281 | |
| 25 | 2.226 | 2 |
| 26 | 2.196 | 2 |
| 27 | 2.166 | 3 |
| 28 | 2.130 | 3 |
| 29 | 2.098 | <2 |
| 30 | 2.056 | 5 |
| 31 | 1.996 | 3 |
| 32 | 1.969 | 9 |
| 33 | 1.952 | |
| 34 | 1.909 | 5 |
| 35 | 1.878 | 7 |
| 36 | 1.847 | 9 |
| 37 | 1.837 | <2 |
| 38 | 1.815 | |
| 39 | 1.799 | 5 |
| 40 | 1.788 | ---------- |
| 41 | 1.756 | ---------- |
| 42 | 1.744 | ---------- |
| 43 | 1.738 | ---------- |

Cadmium selenide hydrazinate is less stable at the reaction temperature at which it is formed than the zinc salt, so that some care must be taken to isolate it in substantially pure form. Formation of cadmium selenide hydrazinate from cadmium selenite and hydrazine according to our invention is marked by a color change in the reaction mixture. The change is one from yellow to orange. At the orange stage the solid present in the reaction mixture is predominantly cadmium selenide hydrazinate, and may be isolated by filtration. However, if the mixture is kept at an elevated temperature the color will darken to maroon and finally to brown-black, at which point the solid is substantially all cadmium selenide. In contrast to zinc selenide hydrazinate, the cadmium selenide hydrazinate produced by our process is an amorphous solid. Both the zinc and cadmium selenide hydrazinates may be characterized by their percent weight loss on heating or digestion with acetic acid since they are converted to the corresponding selenide by such treatment.

The conversion of the zinc or cadmium selenide hydrazinate to the corresponding selenide is carried out by digesting or treating the hydrazinate with acid, preferably at elevated temperature. We prefer to use the general temperature ranges set forth above for the first step of the process (Equation 2). The choice of acid is not critical, and mineral acids such as hydrochloric, hydrobromic or sulfuric acids, or organic carboxylic acids such as formic, acetic, propionic, butyric, valeric or benzoic acids may be employed. We prefer to use lower aliphatic carboxylic acids such as formic, acetic, propionic acids, and particularly acetic acid in this phase of our invention. When the process is used for synthesis of ultrapure zinc and cadmium selenides, it is especially desirable to employ the carboxylic acids to prevent contamination of the resulting solid with inorganic ions such as chloride or bromide. The acid treatment is continued for from about one-half to about six hours and generally about one to three hours of acid digestion are used for optimum results.

At the end of the reaction, the solid selenides are isolated by filtration and dried in an inert atmosphere. They are amorphous solids varying in color from bright yellow zinc selenide to brownish-black cadmium selenide.

The conversion of the hydrazine to the selenide is preferably carried out in the absence of oxygen and in dim light since in the wet state the selenides are readily oxidized. When isolated and dried, however, the zinc and cadmium selenides prepared by our process are amorphous solids reasonably stable in the presence of oxygen, although they are light-sensitive. This stability to oxygen is one of the features that makes the selenides made by our synthesis unique, and which distinguishes them from the zinc and cadmium selenides made by prior art methods.

Alternatively, the selenide hydrazinates may be converted to selenides by heating them in the solid state in an inert atmosphere. On a practical basis, the acid method is preferable from a safety standpoint and also because it is more readily carried out on a large scale.

On the other hand, when the selenites of copper, mercury and lead are reduced with hydrazine, the reaction is more vigorous than with the selenites of zinc and cadmium, and the appropriate metal selenide is the first solid product formed in the reaction mixture. Although we do not wish to be bound by any theoretical explanations of this reaction sequence, we know that the hydrazinates of zinc and cadmium differ in their stability at elevated temperatures, and it is possible that the hydrazinates of copper, mercury and lead selenides do form in the reaction mixture as transitory intermediates but that they are sufficiently soluble and labile to decompose almost immediately to the corresponding selenide.

In any event, the reaction conditions for the hydrazine reduction of copper, mercury or lead selenite are generally the same as those discussed above for the first step of the zinc and cadmium selenite reduction. The copper, mercury or lead selenite is added gradually to the hydrazine at an elevated temperature and the reaction allowed to continue until nitrogen evolution is essentially complete. The solid metal selenide is filtered from the reaction mixture, washed free of mother liquor and dried. The copper, mercury and lead selenides thus produced are crystalline or semi-crystalline solids in contrast to the amorphous zinc and cadmium selenides.

It will be realized by those skilled in the art that our process may be used for making the metal selenides described herein in any desired degree of purity from the corresponding selenites. However, it is particularly advantageous and useful for making ultra-pure selenides (electronic grade). To do this, the metal selenite and hydrazine used as starting materials should be sufficiently pure to preclude any of the contaminants present therein from carrying through to the selenide, and care is taken to employ solvents, acids, and equipment which do not introduce undesired impurities. In this way, we have prepared zinc and cadmium selenides that are substantially spectrophotometrically pure. For instance, we have made zinc selenide having less than one part per million of group VIII metals and less than 10 parts per million of the elements of groups I, III, V and VII of the periodic table.

Another aspect of our invention lies in the activation of the intrinsic metal selenides during their preparation. This is accomplished by adding a small amount of the activator to the metal selenite before it is reduced with hydrazine. Copper and silver are the usual activators for the selenides of our invention. They are ordinarily added in the form of a selenite salt, along with the metal selenite. During the reduction process the metallic activator becomes diffused through the selenide molecule. Only small quantities, of the order of 0.01 mole percent or less, of activator are employed, the exact amount depending upon the intended use of the end product. As is evident, in referring to the substantial spectrophotometric purity of activated selenides, we do not intend to include the activating metal as an undesirable contaminant.

The following examples are given for purposes of illustration and not limitation:

*Example 1*

ZINC SELENIDE HYDRAZINATE ($ZnSe.N_2H_4$)

5400 ml. of hydrazine hydrate and 180 ml. of a saturated aqueous solution of pure zinc acetate (containing about 60 grams of zinc acetate) were added to a 12 liter three-necked flask. The flask was mounted on a steam bath and fitted with a stirrer, reflux condenser and a powder addition funnel. The mixture was heated to about 85° C. with stirring and small portions of zinc selenite added through the powder funnel. When the reaction was well underway, as indicated by effervescence and refluxing of the reaction mixture, the external heat source was removed and 2304 grams of zinc selenite added over a period of 2¾ hours. At the end of this time, the funnel was rinsed into the reaction mixture with deionized water, a nitrogen inlet tube attached to the reaction flask, and the buff colored suspension allowed to cool for two hours in a nitrogen atmosphere and in dim light. The mixture was then filtered. The solid zinc selenide hydrazinate was washed with deionized water and methanol, and dried at room temperature. 1992 grams of zinc selenide hydrazinate were obtained as crystals having a white or nearly white color. The product had an X-ray diffraction pattern corresponding to the one previously set forth in detail.

*Example 2*

ZINC SELENIDE (ZnSe)

Three liters glacial acetic acid and three liters of deionized water were added to a clean 12 liter flask fitted with a stirrer, powder addition funnel and a gas inlet tube. The solution was heated on a steam bath and 1992 grams of solid zinc selenide hydrazinate added. The resulting mixture was heated for two hours under a nitrogen atmosphere and in dim light. During the addition of the hydrazinate and subsequent reaction period, the mixture was stirred periodically.

The reaction mixture was then cooled to room temperature and the solid zinc selenide filtered and washed with deionized water and methanol. It was dried overnight at about 100° C. under carbon dioxide. The zinc selenide thus obtained weighted 1762 grams and had a yellow-brownish color. It should be stored in the absence of light.

*Example 3*

ZINC SELENIDE HYDRAZINATE ($ZnSe.N_2H_4$)

350 ml. of redistilled hydrazine hydrate was added to a one liter flask. A solution of zinc acetate prepared from about 1.5 grams of ultra pure zinc carbonate and redistilled acetic acid was added to the hydrazine hydrate and the mixture warmed until the initial precipitate redissolved. 96.2 grams of ultra-pure zinc selenite was then added to the warm hydrazine in small portions. A lively effervescence began and the solution became yellow upon addition of the zinc selenite. Heating and stirring were continued after addition of all of the selenite until the evolution of nitrogen had stopped. By this time, zinc selenide hydrazinate had formed as a finely divided solid in the reaction mixture. The mixture was cooled, the solid product filtered and washed with a small portion of dilute hydrazine.

*Example 4*

ZINC SELENIDE (ZnSe)

The solid obtained in Example 3 was added, without drying, to a flask containing 500 ml. of 50% acetic acid, and the mixture heated with occasional stirring for about thirty minutes. During this time, the solid material turned yellow in color. The resulting solid zinc selenide was filtered, washed with deionized water and methanol, and dried in vacuo at room temperature. It was electronically pure zinc selenide.

*Example 5*

CADMIUM SELENIDE HYDRAZINATE ($CdSe.N_2H_4$)

To a 12 liter three-necked flask mounted on a steam bath and equipped with a stirrer, thermometer, reflux condenser and a solids feeder was added 4500 ml. of hydrazine hydrate, 2250 ml. of deionized water and 100 ml. of redistilled acetic acid. Nitrogen was added to the flask to provide an inert atmosphere and the liquid heated to 80–85° C. The source of heat was then removed and the 2400 grams of ultra-pure cadmium selenite was added over a period of three hours, the reaction temperature being maintained during this time above 80° C. A vigorous reaction ensued, the color of the suspension gradually becoming deep orange.

The finely divided cadmium selenide hydrazinate containing some cadmium selenide was filtered and drained of excess mother liquor. It was used directly in the wet state for conversion to cadmium selenide.

*Example 6*

CADMIUM SELENIDE (CdSe)

The cadmium selenide hydrazinate obtained in Example 5 was slurried with three liters of redistilled glacial acetic acid and three liters of deionized water. The suspension was warmed on a steam bath for one hour under nitrogen atmosphere. It was then cooled to room temperature under nitrogen, and the solid cadmium selenide filtered, washed with deionized water and with methanol. It was dried at 120° C. under carbon dioxide.

*Example 7*

CADMIUM SELENIDE HYDRAZINATE ($CdSe.N_2H_4$)

150 ml. of 85% hydrazine hydrate and 24 grams of cadmium selenite were mixed in a 250 ml. flask and warmed on a steam bath. Nitrogen was evolved and an orange solid appeared. After three hours the orange precipitate of cadmium selenide hydrazinate was filtered, washed with hydrazine and methanol, and dried.

*Example 8*

CADMIUM SELENIDE (CdSe)

120 grams of purified cadmium selenite was added gradually to 350 ml. of warm 85% hydrazine hydrate. Nitrogen was evolved, and the color of the suspension gradually deepened from yellow to maroon. When evolution of nitrogen had stopped, the solid was filtered and added directly to a mixture of 250 ml. of redistilled glacial acetic acid and 250 ml. of deionized water. The suspension was warmed on a steam bath for 15 minutes with occasional swirling. The resulting cedmium selenide was filtered, washed with deionized water and methanol, and dried in a vacuum desiccator. The dried material weighed 90 grams.

*Example 9*

CADMIUM SELENIDE (CdSe)

718 grams of cadmium selenite was added gradually to two liters of redistilled 85% hydrazine hydrate following the procedure of Example 8. The ensuing reaction was vigorous and a nearly black suspension was obtained. It was treated as in Example 8 and the brownish-black finely divided powder of cadmium selenide was filtered off and dried.

*Example 10*

CADMIUM SELENIDE HYDRAZINATE ($CdSe.N_2H_4$)

To a preheated mixture of 350 ml. of 85% hydrazine hydrate and 10 ml. of glacial acetic acid was added 239 grams of cadmium selenite. The addition of the selenite was carried out very slowly. Evolution of nitrogen began at once. After the nitrogen evolution had stopped the dark red suspension of cadmium selenide hydrazinate was cooled and filtered. On drying the product weighed 180 grams.

*Example 11*

LEAD (II) SELENIDE (PbSe)

331 grams of lead selenite was added slowly to a preheated mixture of 450 ml. of 85% hydrazine hydrate, 200 ml. of distilled water and 5 ml. of glacial acetic acid. The temperature of the reaction mixture was maintained at about 80–85° C. A vigorous reaction occurred and the color of the mixture became black. After evolution of nitrogen had stopped, the solid lead (II) selenide was isolated by filtration. 280 grams of black lead selenide was obtained, the product being graphitic in texture and having a sharp X-ray diffraction pattern identical with that of crystalline lead selenide.

*Example 12*

MERCURY (II) SELENIDE (HgSe)

236 grams of mercury (II) selenite was added gradually with stirring to a mixture of 450 ml. of 85% hydrazine hydrate, 300 ml. of water and 10 ml. of glacial acetic acid which had been preheated to about 80° C. A vigorous reaction ensued, and after nitrogen evolution was substantially complete the resulting solid mercury (II) selenide was isolated by filtration. 190 grams of black crystals were obtained which gave a sharp X-ray diffraction pattern characteristic of crystalline mercury (II) selenide.

The mercury (II) selenite used in this experiment was prepared by mixing equimolar amounts of mercury (II) acetate and selenious acid (in solution) in distilled water. The mercury (II) selenite was obtained as a white precipitate.

*Example 13*

COPPER (II) SELENIDE (CuSe)

280 grams of copper (II) selenite, prepared by mixing equimolar amounts of copper (II) acetate and selenious acid in water, was charged slowly to a solution of 450 ml. of 85% hydrazine hydrate, 300 ml. of water and 10 ml. of glacial acetic acid which had been previously warmed to about 80–85° C. The reaction mixture was maintained at this temperature until addition of the copper (II) selenite was complete and evolution of nitrogen had stopped. The black solid copper (II) selenide was then filtered and dried. It weighed 109 grams and had a somewhat diffuse X-ray diffraction pattern which indicated semi-crystallinity.

*Example 14*

ZINC SELENIDE, COPPER ACTIVATED

An aqueous solution containing one mole of zinc acetate and 0.0001 mole of copper acetate was treated with one mole of purified selenious acid. The resulting solid zinc selenite containing the copper was converted to copper activated zinc selenide following the procedure used in Examples 3 and 4. There was obtained 147 grams of zinc selenide containing 0.01 mole percent of copper.

The ignition of this material under a stream of nitrogen saturated with concentrated hydrochloric acid vapor gave a product which displayed a bright red fluorescence under ultra-violet light, X-ray and cathode ray excitation.

*Example 15*

ZINC SELENIDE, SILVER ACTIVATED

Following the procedure of Example 14, using 0.01 mole percent of silver nitrate in place of copper acetate, there was obtained zinc selenide containing, by spectrographic assay, 0.01 mole percent of silver. Upon ignition the material displayed red luminescence under ultraviolet light, X-ray and cathode ray excitation.

*Example 16*

CADMIUM SELENIDE, COPPER ACTIVATED 671 grams of cadmium oxide was dissolved in 3 liters of 30% acetic acid, and solid sodium carbonate added until a permanent turbidity developed. The mixture was filtered through a pad of filter aid and 380 mg. of $Cu(NO_3)_2.3H_2O$ added to the clear filtrate. Upon addition of 5.2 moles of purified selenious acid, 1264 grams of cadmium selenite containing copper was obtained. This product was added to a preheated mixture of 2300 ml. of redistilled hydrazine hydrate, 2000 ml. of water and 25 ml. of glacial acetic acid. Following the general procedure of Example 8, there was obtained 981 grams of copper activated cadmium selenide.

Any departure from the above description which conforms to the present invention is intended to be included within the scope of the claims.

What is claimed is:

1. A heavy metal hydrazinate having the formula—

$$MSe.N_2H_4$$

in which M is a metal of group IIB of the periodic table of elements having an atomic weight greater than 64 and less than 113.

2. Zinc selenide hydrazinate having the formula—

$$ZnSe.N_2H_4$$

3. Cadmium selenide hydrazinate having the formula—

$$CdSe.N_2H_4$$

4. In the process of producing a heavy metal selenide, the step that comprises treating a heavy metal selenite of the formula $$MSeO_3$$

with hydrazine at a temperature of between about 50° C. and the boiling point of the reaction mixture, the molar ratio of hydrazine, as hydrazine hydrate, to heavy metal selenite being between about 4:1 and 14:1, to produce a heavy metal selenide hydrazinate of the formula $MSe.N_2H_4$ wherein M in the above formulae is a member of group IIB of the periodic table of elements having an atomic weight greater than 64 and less than 113.

5. The process of claim 4 wherein the reaction is carried out in the presence of an anion of a lower aliphatic carboxylic acid.

6. In the process of producing zinc selenide, the step that comprises treating zinc selenite with hydrazine hydrate in the presence of acetate ion and at a temperature of between about 50° C. and the boiling point of the reaction mixture, the molar ratio of hydrazine hydrate to zinc selenite being between about 4:1 and 14:1, to produce zinc selenide hydrazinate the formula $$ZnSe.N_2H_4$$

7. In the process of producing cadmium selenite, the step that comprises treating cadmium selenite with hydrazine hydrate in the presence of acetate ion and at a temperature of between about 50° C. and the boiling point of the reaction mixture, the molar ratio of hydrazine hydrate to cadmium selenite being about 4:1 and 14:1, to produce cadmium selenide hydrazinate of the formula $CdSe.N_2H_4$.

8. A method of producing a heavy metal selenide of the formula $$MSe$$

wherein M is a metal of group IIB of the periodic table of elements having an atomic weight greater than 64 and less than 113, which comprises heating a hydrazinate of the formula $$MSe.N_2H_4$$

wherein M is as defined above, with an acid selected from the class consisting of hydrohalic and sulfuric acids at a temperature of between about 50° C. and the boiling point of the mixture.

9. A method of producing a heavy metal selenide of the formula $$MSe$$

wherein M is a metal of group IIB of the periodic table of elements having an atomic weight greater than 64 and less than 113, which comprises heating a hydrazinate of the formula $$MSe.N_2H_4$$

wherein M is as defined above, with a lower aliphatic carboxylic acid at a temperature of between about 50° C. and the boiling point of the mixture.

10. A method of producing a heavy metal selenide of the formula $$MSe$$

wherein M is a metal of group IIB of the periodic table of elements having an atomic weight greater than 64 and less than 113, which comprises heating a hydrazinate of the formula $$MSe.N_2H_4$$

wherein M is as defined above, with acetic acid at a temperature of between about 50° C. and the boiling point of the mixture.

11. A method of producing a heavy metal selenide of the class consisting of copper selenide, mercury selenide and lead selenide that comprises treating a selenite of such heavy metal with from about 4 moles to about 14 moles of hydrazine hydrate per mole of heavy metal selenite at a temperature of between about 50° C. and the boiling point of the reaction mixture, and recovering the heavy metal selenide thus produced.

12. The process of claim 11 wherein the reaction is carried out in the presence of a lower aliphatic carboxylic acid.

13. A method of producing copper selenide that comprises treating copper selenite with from about 4 moles to about 14 moles of hydrazine hydrate per mole of copper selenite at a temperature of from 50° C. to the boiling point of the mixture in the presence of acetic acid, and recovering the copper selenide thus formed.

14. A method of producing zinc selenide in the form of an amorphous solid stable in the presence of oxygen which comprises treating zinc selenide hydrazinate with a lower aliphatic carboxylic acid at a temperature between about 50° C. and the boiling point of the reaction mixture.

15. A method of producing cadmium selenide in the form of an amorphous solid stable in the presence of oxygen which comprises treating cadmium selenide hydrazinate with a lower aliphatic carboxylic acid at a temperature between about 50° C. and the boiling point of the reaction mixture.

References Cited in the file of this patent

UNITED STATES PATENTS

| | | |
|---|---|---|
| 2,176,495 | Gordon et al. | Oct. 17, 1939 |
| 2,402,759 | Severenz | June 25, 1946 |
| 2,698,915 | Piper | Jan. 4, 1955 |
| 2,767,049 | Nitsche | Oct. 16, 1956 |

OTHER REFERENCES

Hovorka in "Chemical Abstracts," vol. 27, Column 5020(2) (1933).

Mellor: "Comprehensive Treatise on Inorganic and Theoretical Chemistry," Longmans, Green & Co., New York, 1923, vol. 10, pages 776–778, and 881.